(12) United States Patent
Takeuchi

(10) Patent No.: US 10,656,463 B2
(45) Date of Patent: May 19, 2020

(54) DISPLAY DEVICE

(71) Applicant: Sharp Kabushiki Kaisha, Sakai, Osaka (JP)

(72) Inventor: Seiji Takeuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/433,003

(22) Filed: Jun. 6, 2019

(65) Prior Publication Data
US 2019/0384114 A1  Dec. 19, 2019

Related U.S. Application Data

(60) Provisional application No. 62/685,316, filed on Jun. 15, 2018.

(51) Int. Cl.
*G02F 1/1335* (2006.01)
*G02F 1/1333* (2006.01)
*G02F 1/13357* (2006.01)

(52) U.S. Cl.
CPC .. *G02F 1/133603* (2013.01); *G02F 1/133305* (2013.01); *G02F 1/133308* (2013.01); *G02F 2001/133317* (2013.01)

(58) Field of Classification Search
CPC ......... G02F 1/133305; G02F 1/133308; G02F 1/133603
See application file for complete search history.

(56) References Cited

U.S. PATENT DOCUMENTS

2012/0230016 A1\* 9/2012 Hashino ............... G02B 6/0088
362/97.1

FOREIGN PATENT DOCUMENTS

JP  2013-238888 A  11/2013

\* cited by examiner

*Primary Examiner* — Thomas M Sember
(74) *Attorney, Agent, or Firm* — Keating & Bennett, LLP

(57) ABSTRACT

A display device includes a display panel, a backlight device, and a fixing member. The backlight device is disposed to face the display panel. The fixing member having stickiness is disposed between the display panel and the backlight device to fix the display panel and the backlight device together. The display panel includes a panel-side attachment portion to which the fixing member is bonded. The panel-side attachment portion includes a rough surface portion including a section thereof roughened.

5 Claims, 5 Drawing Sheets

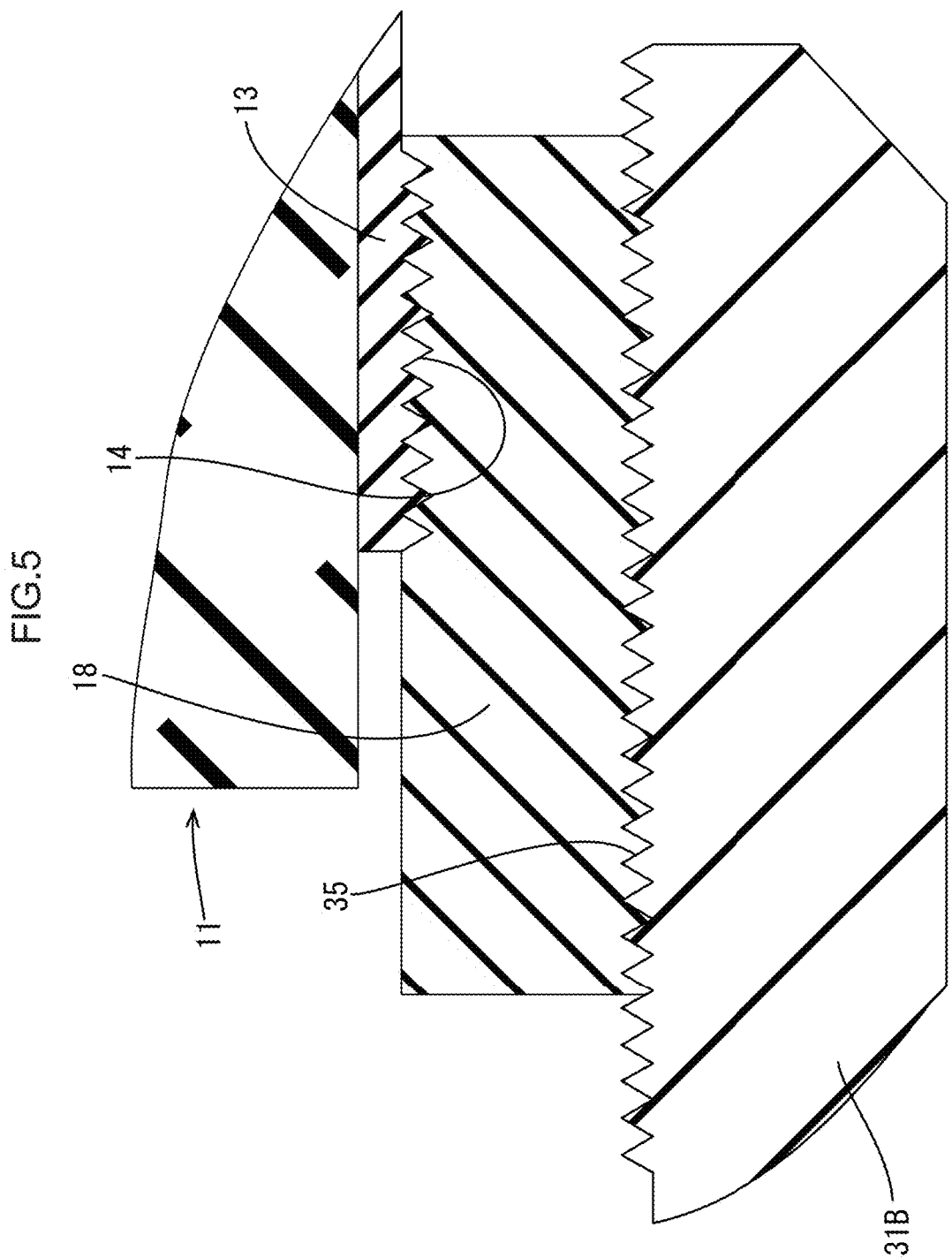

DISPLAY DEVICE

CROSS REFERENCE TO RELATED APPLICATION

This application claims priority from U.S. Provisional Application No. 62/685,316 filed on Jun. 15, 2018. The entire contents of the priority application are incorporated herein by reference.

TECHNICAL FIELD

The technology disclosed herein relates to a display device.

BACKGROUND ART

Conventionally, a flat and thin display device that is used for an electronic appliance includes at least a display panel that displays an image and a backlight device that delivers light from a rear surface of the display panel. This type of display device often employs a double-sided tape with stickiness in bonding components together. For example, the display panel may be fixed to a frame of the backlight device with the double-sided tape. To the double-sided tape, static and dynamic force is applied constantly. An example of such a system is disclosed in Japanese Patent Application Publication No. 2013-238888.

The holding power by the double-sided tape tends to decrease over time due to, for example, a difference in thermal expansion rate with respect to a temperature change between the display panel and the frame. If the partial separation should occur due to such a decrease in holding power, the stress applied to the display panel becomes inhomogeneous and display unevenness may occur. In addition, as the holding power decreases, the display panel may deviate from a predetermined position of the frame or be detached due to its own weight and accordingly, the reliability of the display device decreases. Such a decrease in holding power is observed particularly on the display panel side, where the flatness is higher than on the frame side.

Moreover, in recent years, the narrower-frame models have been developed. In such a structure, it is difficult to sufficiently secure the area to paste the double-sided tape and thus, it is necessary to secure the sufficient holding power in the narrow area.

SUMMARY

The technology disclosed herein has been made in view of the above circumstance, and an object is to provide a display device that has a high holding power for holding a display panel and a backlight device in a case of fixing the display panel to the backlight device with a fixing member with stickiness.

(1) The technology disclosed herein is a display device including a display panel, a backlight device that is disposed to face the display panel, and a fixing member with stickiness that is provided between the display panel and the backlight device and is used to fix the display panel to the backlight device integrally. The display panel includes a panel-side attachment portion where the fixing member is bonded, and the panel-side attachment portion includes a rough surface portion including a section thereof roughened.

In general, a surface of an object includes a number of minute concavoconvex shapes in a microscopic point of view. When two objects are bonded together, a polymer chain of a sticky agent or an adhesive material enters the minute concavoconvex shapes to cause an anchoring effect (anchor effect). Thus, with the interfaces of the objects tangled with each other geometrically, the two objects are fixed to each other. However, since the concavoconvex shapes of the surface of the display panel are minute due to its structure and the anchoring effect is small, the holding power tends to be insufficient.

In view of such a circumstance, in the above structure, the rough surface portion with the concavoconvex shape formed by physical processing or the like is provided to the panel-side attachment portion of the display panel for which the anchoring effect by the fixing member is hard to achieve because of high flatness. Thus, the fixing member enters the concavoconvex shape. Therefore, as the fixing member enters the display panel, the molecules get closer to the molecules of the display panel until the molecules are attracted to each other. That is to say, the adhesion power is increased by the intermolecular force, and the decrease in static adhesion power, that is, the decrease in holding power due to temperature change or over time can be reduced.

Note that the rough surface portion can be formed using a wide gun with high uniformity and a micro-polisher. In one example of a method of forming the minute concavoconvex shapes, blasting, a plasma surface process, or the like is performed.

According to the technology disclosed herein, a display device that has a high holding power for holding a display panel and a backlight device in a case of fixing the display panel to the backlight device with a fixing member with stickiness can be provided.

BRIEF DESCRIPTION OF THE DRAWINGS

FIG. 5 is a magnified cross-sectional side view illustrating a relevant portion of FIG. 4.

DETAILED DESCRIPTION

One embodiment is described with reference to FIG. 1 to FIG. 5. In the present embodiment, a liquid crystal display device (one example of display device) 10 including a liquid crystal panel 11 as a display panel is described. Note that an X axis, a Y axis, and a Z axis are shown in some drawings, and each axial direction coincides with the direction indicated in each drawing. An up-down direction is based on FIG. 3, and an upper side in this drawing corresponds to a front side and a lower side therein corresponds to a back side.

Figure 1:
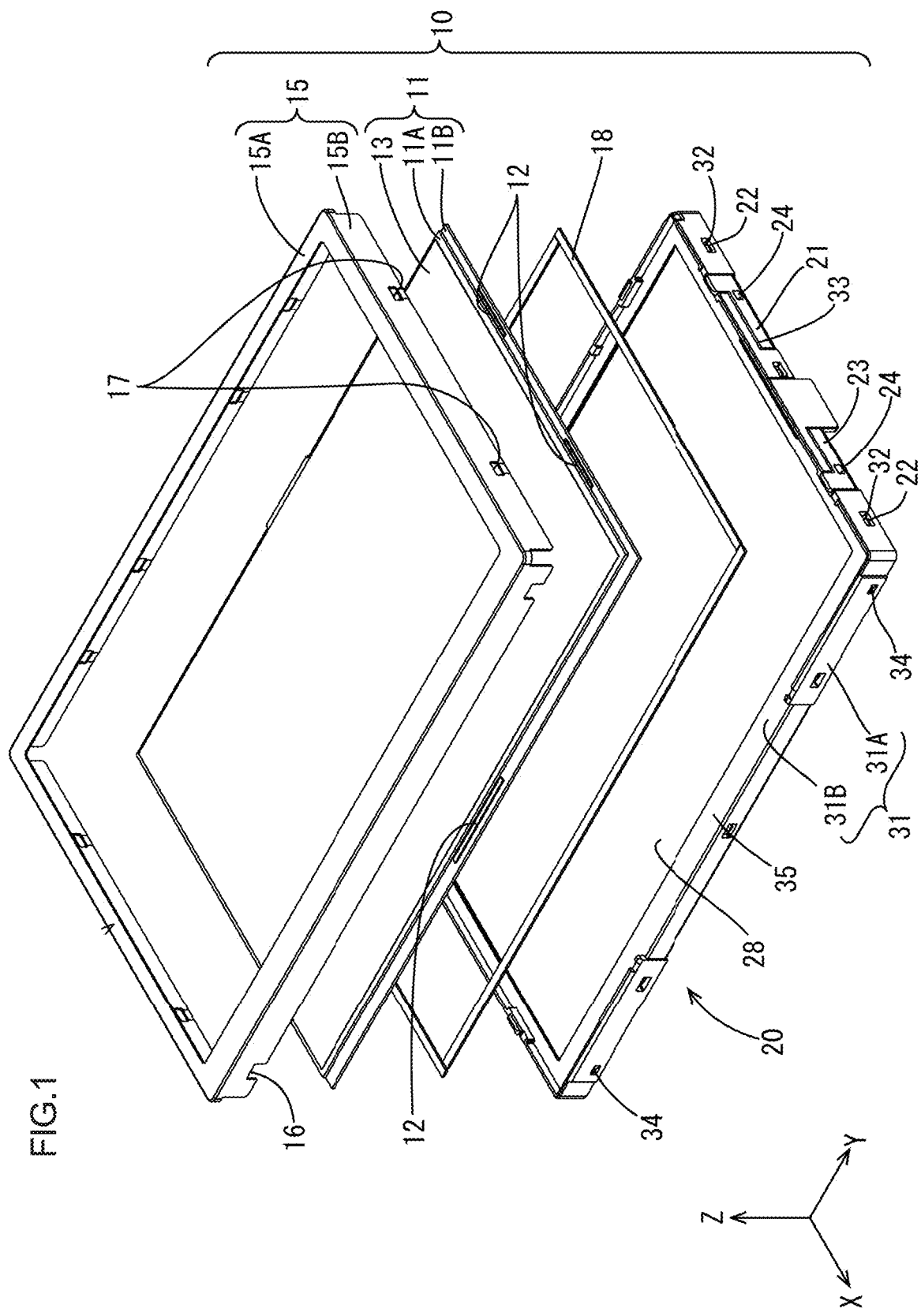
FIG. 1 is an exploded perspective view of a liquid crystal display device according to one embodiment.
Figure 2:
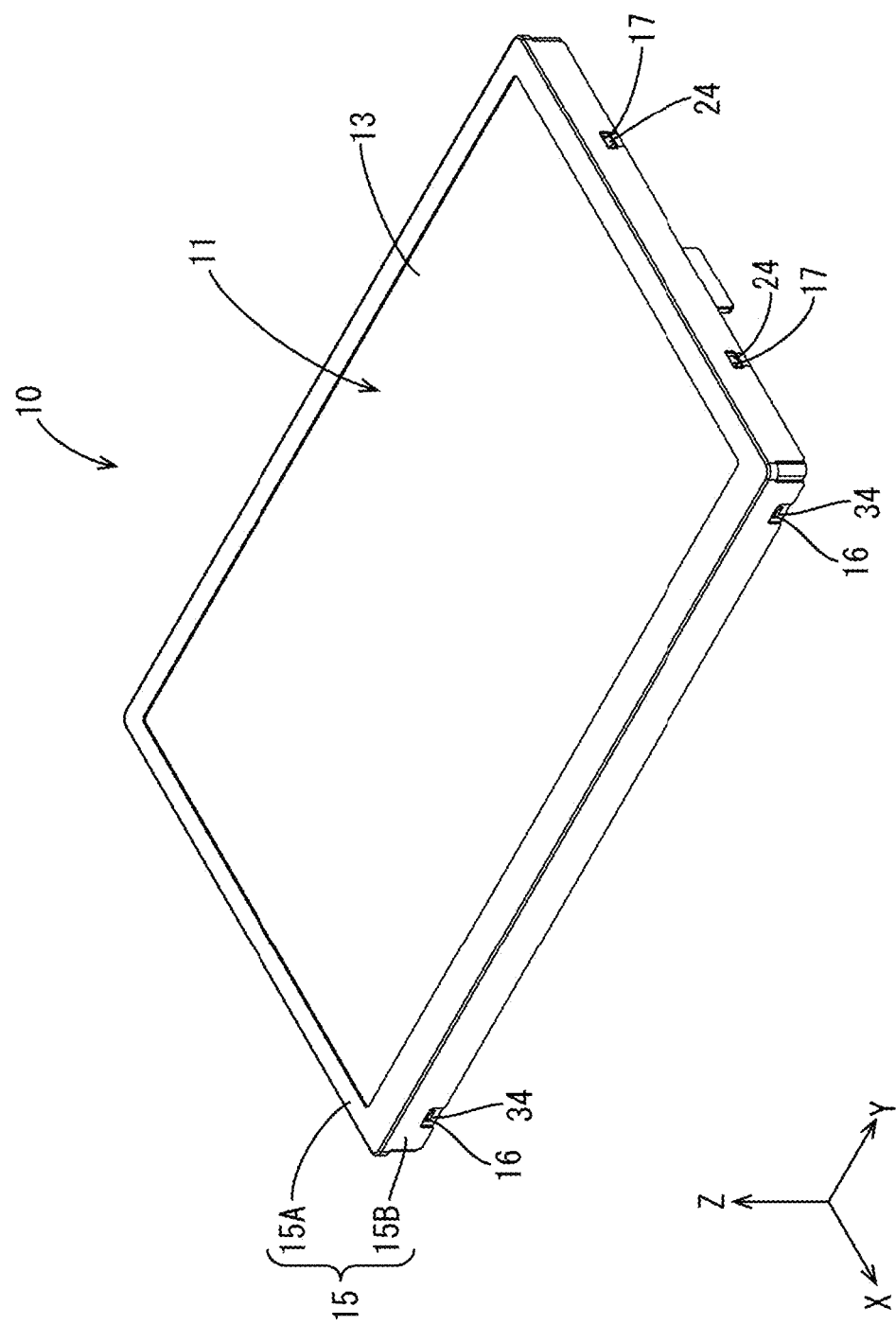
FIG. 2 is a perspective view of the liquid crystal display device.

The liquid crystal display device 10 has a rectangular shape as a whole. As illustrated in FIG. 1, for example, the liquid crystal display device 10 includes the liquid crystal panel 11 with a plate shape that can display an image, and a backlight device 20 that is disposed on a back side with respect to the liquid crystal panel 11 and supplies light to the liquid crystal panel 11. The liquid crystal panel 11 and the backlight device 20 are held integrally by a bezel 15 with a frame shape. The liquid crystal display device 10 according to the present embodiment is usable for various kinds of electronic appliances including a mobile information terminal (such as mobile phone, smart phone, or tablet personal computer), an on-vehicle information terminal (such as stationary type car navigation system, or portable type car navigation system), and a mobile game machine.

As illustrated in FIG. 1, the liquid crystal panel 11 has a rectangular plate shape and has a known structure in which a pair of glass substrates 11A and 11B that is transparent (has high light-transmitting property) is attached together with a predetermined gap therebetween, and a liquid crystal layer (not shown) is disposed between the glass substrates 11A and 11B. Of the pair of glass substrates 11A and 11B, the glass substrate 11A is on the front side and the glass substrate 11B is on the back side. The long side and the short side of the glass substrate 11B are both longer than the long side and the short side of the glass substrate 11A. The pair of glass substrates 11A and 11B is stacked on each other with their edges on two adjacent sides aligned exactly. In an area of the glass substrate 11B on the back side, which is slightly larger, that protrudes from the glass substrate 11A on the front side, a panel driving unit 12 that drives the liquid crystal panel 11 is provided.

On the glass substrate 11B on the back side, for example, a switching element (such as TFT) connected to a source line and a gate line, which are provided orthogonal to each other, a pixel electrode connected to the switching element, an alignment film, and the like are formed. On the glass substrate 11A on the front side, for example, a color filter where colored portions of R (red), G (green), and B (blue) are arranged in a predetermined order, a counter electrode, an alignment film, and the like are formed. Among these, to the source line, the gate line, the counter electrode, and the like, image data and various kinds of control signals necessary for displaying an image are supplied from a driving circuit board that is not shown.

Figure 4:
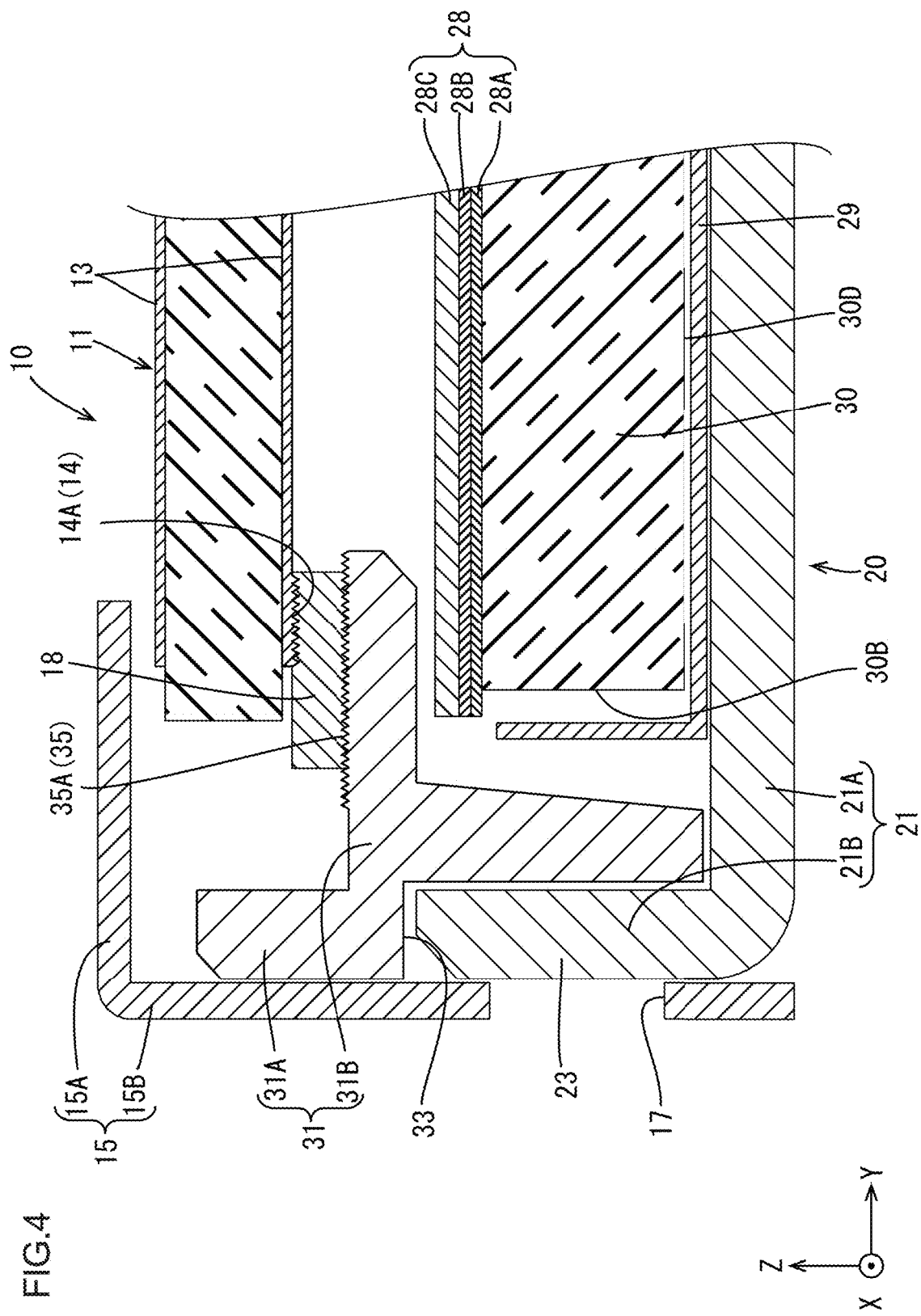
FIG. 4 is a magnified cross-sectional side view illustrating a relevant portion of FIG. 3.

Outside the glass substrates 11A and 11B, a polarizing plate 13 is disposed (see FIG. 4). The polarizing plate 13 has a sheet shape that is slightly smaller than the outer shape of the glass substrates 11A and 11B, and covers the outer surface of the glass substrates 11A and 11B with the front and back edges of the liquid crystal panel 11 exposed like a frame shape; thus, the liquid crystal panel 11 is formed. In the present embodiment, the liquid crystal panel 11 includes the polarizing plate 13.

The liquid crystal panel 11 can display an image by using the light supplied from the backlight device 20, and its front side corresponds to an emission side. Note that the long-side direction of the liquid crystal panel 11 coincides with the Y-axis direction, the short-side direction thereof coincides with the X-axis direction, and the thickness direction thereof coincides with the Z-axis direction.

The bezel 15 is formed of a metal material (such as aluminum), and has a rectangular frame shape as a whole. The bezel 15 includes a panel pressing portion 15A that presses an end of the liquid crystal panel 11 along the entire perimeter from the front side, and an outer cylindrical portion 15B that projects to the back side from an outer peripheral end of the panel pressing portion 15A and that surrounds the backlight device 20 from the outer peripheral side. The liquid crystal panel 11 is held between the bezel 15 and the backlight device 20, and is fixed to the backlight device 20 with a panel fixing tape (one example of fixing member) 18 to be described below.

The backlight device 20 has an approximately block-like shape that is rectangular in plan view, which is similar to the liquid crystal panel 11 as a whole. The backlight device 20 includes a chassis 21 with an approximately box-like shape that opens to the liquid crystal panel 11, a plurality of LEDs (light-emitting diodes) 25 corresponding to a light source and an LED substrate 26 having the LEDs 25 mounted thereon, a light guide plate 30 that guides the light emitted from the LEDs 25, a plurality of optical sheets 28 that is stacked on a front side of the light guide plate 30, a reflection sheet 29 that is stacked on a back side of the light guide plate 30, and a frame 31 that collectively surrounds these members from the outer peripheral side.

The backlight device 20 includes the LEDs 25 on an end surface of the light guide plate 30 along one short side, and is an edge light type (side light type) of one-side light incidence that allows the light to enter the light guide plate 30 only from one side. The backlight device 20 shapes the light from the LEDs 25 into planar light, and delivers the resulting light from an opening of the chassis 21 to the liquid crystal panel 11 on the front side. That is to say, the front side of the backlight device 20 corresponds to the emission side. The components of the backlight device 20 are hereinafter described in detail.

The chassis 21 is formed of a metal material such as an aluminum plate or an electrolytic zinc-coated steel sheet (SECC) and has a rectangular shape in plan view. The chassis 21 has an approximately box-like shape that opens to the front side, and contains the LED substrate 26, the light guide plate 30, and the like. The chassis 21 includes a bottom plate portion 21A with a rectangular shape, and walls 21B each rising from an edge of the bottom plate portion 21A (a pair of long sides and a pair of short sides) to the front side. The bottom plate portion 21A of the chassis 21 has its long-side direction coinciding with the Y-axis direction, its short-side direction coinciding with the X-axis direction, and its direction orthogonal to the plate surface coinciding with the Z axis.

The bottom plate portion 21A supports the members inside the chassis 21 from the back side. The walls 21B are disposed to surround the members in the chassis 21 from the outer peripheral side, so as to have the rectangular frame-like shape as a whole. An outer surface of the wall 21B is provided with a plurality of first engagement projections 22 for engaging the wall 21B to the frame 31 to be described below. In addition, the wall 21B includes a plurality of extension portions 23 that extends partially to the outside, and each extension portion 23 includes a second engagement projection 24 for engaging the wall 21B to the bezel 15.

The LED 25 has a structure in which an LED chip (LED element) corresponding to a semiconductor light-emitting element on a substrate portion fixed to a plate surface of the LED substrate 26 to be described below is sealed with a resin material. The LED chip on the substrate portion emits light with one kind of main wavelength, specifically, light with a single color of blue. On the other hand, in the resin material that seals the LED chip, a fluorescent that is excited by blue light from the LED chip and emits light of a predetermined color is dispersedly disposed, and as a whole, generally white light is emitted. This LED 25 is a top view type (top emission type, upper surface emission type) in which a light-emitting surface to emit light is directed to a side opposite to the LED substrate 26 side.

The LED 25 emits light with a predetermined divergence from an optical axis (directivity) from the light-emitting surface. In the present embodiment, the optical axis of the emitted light is approximately perpendicular to the central portion of the light-emitting surface.

The LED substrate 26 has a wiring pattern (not shown) formed on a base material film including thermosetting resin such as urethane resin or epoxy resin. The wiring pattern is used to supply current to the LEDs 25. For example, a thermosetting resin layer of polyimide resin or the like that has the thermoplastic property is stacked on the LED substrate 26 and on this thermoplastic resin layer, the plurality of LEDs 25 are surface mounted intermittently.

The LED substrate 26 is disposed along an inner surface of the wall 21B of the chassis 21 such that the light-emitting surface of the LED 25 is arranged to face, and in parallel to, the end surface of the light guide plate 30 on the short side (light incidence surface 30A).

The light guide plate 30 is formed of, for example, transparent synthetic resin such as acrylic resin or polycarbonate, and has an approximately rectangular plate shape in plan view that is slightly smaller than the bottom plate portion 21A of the chassis 21, and is disposed in parallel to the bottom plate portion 21A of the chassis 21. The light guide plate 30 has a long-side direction (length direction) thereof coinciding with the Y-axis direction, a short-side direction (width direction) thereof coinciding with the X-axis direction, and a plate thickness direction orthogonal to a plate surface thereof coinciding with the Z-axis direction. The light guide plate 30 is contained in a manner that the periphery is surrounded by the walls 21B in the chassis 21.

Figure 3:
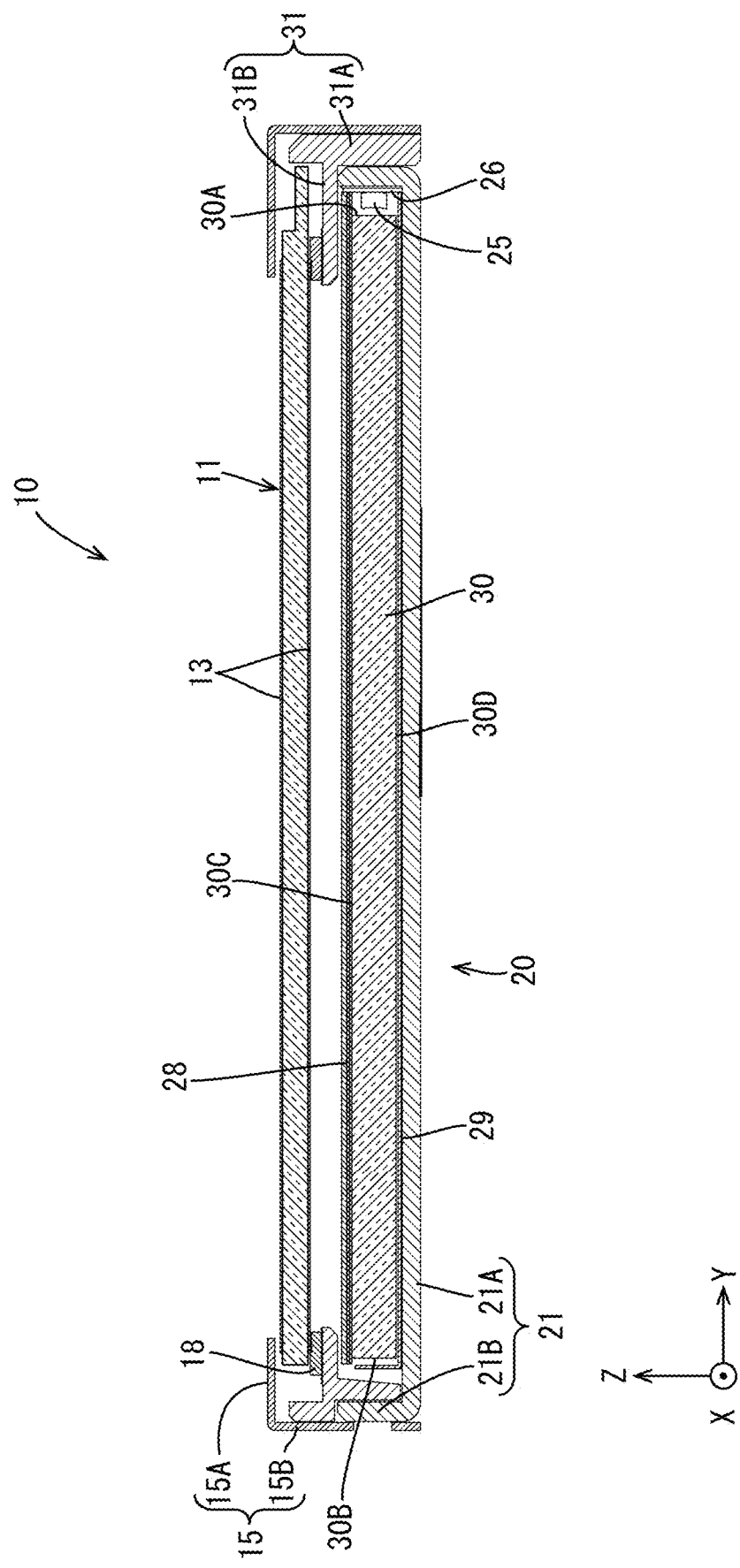
FIG. 3 is a cross-sectional side view of the liquid crystal display device.

The end surface among the outer peripheral end surfaces of the light guide plate 30 that is on the right short side illustrated in FIG. 3 is the light incidence surface 30A to which the light is incident from the LEDs 25, and the surface opposite to the light incidence surface 30A is an incidence opposite surface 30B. The light incidence surface 30A is disposed to face, and in parallel to, the light-emitting surface of the LED 25 with a predetermined distance as described above. Of a pair of plate surfaces, an upper surface (front surface) is a light exiting surface 30C that emits the light, which has entered the light guide plate 30, toward the liquid crystal panel 11. Of the pair of plate surfaces, a lower surface (back surface) is a reflection surface 30D that reflects the light, which is directed from the inside of the light guide plate 30 to the lower surface (back surface), toward the light exiting surface 30C.

The light guide plate 30 is disposed right below the liquid crystal panel 11 through the optical sheet 28 stacked on the light exiting surface 30C. The optical sheet has a flat, rectangular sheet shape, and a long-side direction thereof coincides with the Y-axis direction and a short-side direction thereof coincides with the X-axis direction. Since the optical sheet 28 is disposed between the light guide plate 30 and the liquid crystal panel 11, the optical sheet 28 transmits the emission light from the light guide plate 30, and while applying a predetermined optical action to the resulting transmission light, emits the light toward the liquid crystal panel 11.

The optical sheet 28 according to the present embodiment has a three-layer structure and from the bottom to the top, a diffusion sheet 28A, a lens sheet 28B, and a reflective polarizing sheet 28C are stacked in order.

On the other hand, the reflection sheet 29 is stacked on the back surface side of the light guide plate 30 (reflection surface 30D side). This reflection sheet 29 includes a sheet material formed of synthetic resin with a front surface thereof exhibiting white color that is superior in light reflectivity. Thus, the light propagating in the light guide plate 30 and then emitted from the reflection surface 30D can be delivered upward effectively to the front surface (light exiting surface 30C). The reflection sheet 29 has a rectangular shape in plan view, and the most portion on the central side is held between the light guide plate 30 and the bottom plate portion 21A of the chassis 21.

Ends of the reflection sheet 29 are extended to the outside over the outer peripheral end surfaces of the light guide plate 30. The end on the LED 25 side is extended to the place right under the LED 25, so that the light directly coming from the LED 25 can be reflected efficiently and the reflected light can enter the light incidence surface 30A. The end opposite to the LED 25 side is bent toward the light guide plate 30 so as to have an L-like shape and is disposed to face the incidence opposite surface 30B of the light guide plate 30.

The frame 31 is formed of a metal material or synthetic resin such as polycarbonate, and includes a side plate portion 31A with a rectangular frame shape in plan view that enables the chassis 21 to be fitted to the inside exactly. The height of the side plate portion 31A is larger than the height of the chassis 21. Note that the long-side direction of the frame 31 coincides with the Y-axis direction, the short-side direction thereof coincides with the X-axis direction, and the height direction thereof coincides with the Z-axis direction.

The side plate portion 31A of the frame 31 includes a plurality of frame-side engagement holes 32 that engages the plurality of first engagement projections 22 of the chassis 21 at the positions corresponding to the first engagement projections 22. An outer surface of the side plate portion 31A of the frame 31 includes a concave portion 33 that is formed by cutting a lower edge into the concave shape at the position corresponding to the extension portion 23 of the chassis 21. To the concave portion 33, the extension portion 23 of the chassis 21 can be fitted. With the engagement structure of the first engagement projections 22 and the frame-side engagement holes 32 and the concavoconvex fitting between the extension portion 23 and the concave portion 33, the chassis 21 and the frame 31 can be held integrated.

The frame 31 is surrounded by the outer cylindrical portion 15B of the bezel 15 from the outer peripheral side. The frame 31 and the bezel 15 are positioned relative to each other in a manner that a positioning projection 34 provided to the outer surface of the frame 31 is inserted into a positioning concave portion 16 with a groove shape that is formed by cutting a lower edge of the outer cylindrical portion 15B into a concave shape. With the frame 31 and the bezel 15 assembled together, the second engagement projection 24 provided to the extension portion 23 of the chassis 21 is engaged with a bezel-side engagement hole 17 provided to the outer cylindrical portion 15B, and with this holding structure, the chassis 21 and the bezel 15 are held in the assembled state.

In addition, on the inner surface of the frame 31, a supporting portion 31B with a flat flake shape that projects inward and can support the end of the liquid crystal panel 11 from below is provided continuously along the entire perimeter. In the state where the frame 31 and the chassis 21 are assembled together, the supporting portion 31B is set at a position not interfering with the walls 21B of the chassis 21, that is, above the upper end surface of the walls 21B. The liquid crystal panel 11 is fixed to the supporting portion 31B through a panel fixing tape 18, which is described next (see FIG. 3).

The panel fixing tape 18 is made of synthetic resin, and as a whole, the panel fixing tape 18 is formed by applying an adhesive on both surfaces of a base material with a rectangular frame shape along the end of the liquid crystal panel 11. The base material of the panel fixing tape 18 has a light-blocking property because its surface is black. Note that the adhesive provided to both surfaces of the base material includes acrylic, urethane, silicone, or the like. Among these resins, acrylic adhesive is preferable because acrylic adhesive has high stickiness with the polymer alone, is freely modifiable, is superior in heat resistance and weather resistance, and is attachable to a variety of bodies.

An area in the liquid crystal panel 11 where the panel fixing tape 18 is disposed is referred to as a panel-side attachment portion 14. The panel-side attachment portion 14 is a frame-shaped area along the edge of the polarizing plate 13. An area in the backlight device 20 where the panel fixing tape 18 is disposed is referred to as a backlight-side attachment portion 35. In the present embodiment, the backlight-side attachment portion 35 is a front surface of the supporting portion 31B of the frame 31 (surface opposite to the light guide plate 30).

In the present embodiment, the fixed surfaces of the liquid crystal panel 11 and the backlight device 20, that is, the panel-side attachment portion 14 and the backlight-side attachment portion 35 are respectively rough surface portions 14A and 35A with the entire surface roughened. The rough surface portions 14A and 35A have randomly minute concavoconvex shapes, and the arithmetic mean roughness Ra expressing the surface roughness thereof is several micrometers to several tens of micrometers. It is preferable that Ra is less than 10 µm. In the present embodiment, the rough surface portions 14A and 35A are formed using a wide gun with high uniformity, and a micro-polisher.

In the state where the panel fixing tape 18 is bonded to a predetermined pasting position, an outer edge of the panel fixing tape 18 projects outward over an outer edge of the liquid crystal panel 11. That is to say, the panel fixing tape 18 is formed to be slightly larger than the liquid crystal panel 11. The rough surface portion 35A of the backlight-side attachment portion 35 is formed to be wider than the panel fixing tape 18; thus, even in the occurrence of an error in position of installing the panel fixing tape 18 to the backlight device 20, the error can be absorbed.

The liquid crystal display device 10 according to the present embodiment has the structure as above, and next, the operation and effect are described.

The liquid crystal display device 10 according to the present embodiment includes: the liquid crystal panel 11; the backlight device 20 that is disposed to face the liquid crystal panel 11; and the panel fixing tape 18 with stickiness that is provided between the liquid crystal panel 11 and the backlight device 20 and is used to fix the liquid crystal panel 11 to the backlight device 20 integrally. In the liquid crystal panel 11, the whole panel-side attachment portion 14 where the panel fixing tape 18 is bonded is the rough surface portion 14A that is roughened.

By this structure, the rough surface portion 14A with the concavoconvex shape is provided to the end of the polarizing plate 13 of the liquid crystal panel 11 for which the holding power by the panel fixing tape 18 easily decreases because of high flatness. Thus, the panel fixing tape 18 enters the concavoconvex shape. Therefore, the molecules of the panel fixing tape 18 get closer to the molecules of the polarizing plate 13 until the molecules are attracted to each other. That is to say, the adhesion power is increased by the intermolecular force, and the decrease in static adhesion power (holding power) due to temperature change or over time can be reduced.

In addition, the panel fixing tape 18 is bonded continuously along the entire perimeter of the liquid crystal panel 11 (polarizing plate 13) and the rough surface portion 14A is provided along the entire panel-side attachment portion 14 of the polarizing plate 13. Therefore, the stress to be applied to the liquid crystal panel 11 is diffused uniformly along the entire perimeter and the display unevenness and the like do not occur easily. Accordingly, the display quality of the liquid crystal display device 10 is maintained.

In addition, since the rough surface portion 14A on the liquid crystal panel 11 side is provided to the polarizing plate 13, the production is easier compared to the structure in which the rough surface portion 14A is provided to the glass substrate 11B.

Furthermore, since the rough surface portion 35A is also provided to the backlight-side attachment portion 35, the displacement between the panel fixing tape 18 and the backlight device 20 can be suppressed.

Other Embodiments

The technology disclosed herein is not limited to the embodiments described above with reference to the drawings, and for example, the following embodiments are also included in the technical range.

(1) In the above embodiments, the rough surface portions 14A and 35A are formed by roughening the entire panel-side attachment portion 14 and the entire backlight-side attachment portion 35, respectively; however, the rough surface portion may be provided to the panel-side attachment portion 14 side only, or to just a portion of the panel-side attachment portion 14.

(2) In the above embodiments, the panel-side attachment portion 14 is provided to the polarizing plate 13 of the liquid crystal panel 11; however, the panel-side attachment portion 14 may be provided to the glass substrate 11B.

(3) In the above embodiments, the panel fixing tape 18 and the rough surface portion 14A of the panel-side attachment portion 14 are provided along the entire perimeter; however, the panel fixing tape 18 and the rough surface portion 14A of the panel-side attachment portion 14 may be provided to just a portion. In this case, it is preferable to provide those such that the stress, which applies to the liquid crystal panel 11, is not concentrated on one place.

(4) In the above embodiments, the liquid crystal panel 11 is fixed through the panel fixing tape 18 to the supporting portion 31B of the frame 31 provided to the backlight device 20; however, the structure of the backlight device 20 can be changed as appropriate. In this case, the fixing position of the liquid crystal panel 11 is not limited to the frame and in short, it is only necessary that the liquid crystal panel 11 is fixed through the fixing member with stickiness.

The invention claimed is:

1. A display device comprising:
   a display panel;
   a backlight device disposed to face the display panel; and
   a fixing member having stickiness and disposed between the display panel and the backlight device to fix the display panel and the backlight device together, wherein
   the display panel includes a panel-side attachment portion to which the fixing member is bonded, the panel-side attachment portion including a rough surface portion including a section thereof roughened,
   the display panel includes a polarizing plate disposed over a surface of the display panel, and
   the rough surface portion is included in the polarizing plate.

2. The display device according to claim 1, wherein the fixing member is bonded continuously along an entire perimeter of the display panel.

3. The display device according to claim 1, wherein the rough surface portion is disposed along an entire perimeter of the panel-side attachment portion.

4. The display device according to claim 1, wherein
the backlight device includes a backlight-side attachment portion to which the fixing member is bonded, and
the backlight-side attachment portion includes a second rough surface portion including a section thereof roughened.

5. A display device comprising:
a display panel;
a backlight device disposed to face the display panel; and
a fixing member having stickiness and disposed between the display panel and the backlight device to fix the display panel and the backlight device together, wherein
the display panel includes a panel-side attachment portion to which the fixing member is bonded,
the panel-side attachment portion includes a rough surface portion including a roughened section thereof, and
the rough surface portion includes randomly concavoconvex shapes with an arithmetic mean roughness Ra of 3 μm or more and less than 10 μm.

\* \* \* \* \*